(12) United States Patent (10) Patent No.: US 12,594,893 B2
Yan et al. (45) Date of Patent: Apr. 7, 2026

(54) VEHICLE CAMERA MOUNTING STRUCTURE

(71) Applicant: FCA US LLC, Auburn Hills, MI (US)

(72) Inventors: Zhenghong Yan, Shanghai (CN); Zi Ye Wang, Shanghai (CN); Wenbin Song, Shanghai (CN); Dan Li, Shanghai (CN); Bing Li, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/743,477

(22) Filed: Jun. 14, 2024

(65) Prior Publication Data

US 2025/0381921 A1 Dec. 18, 2025

(51) Int. Cl.
B60R 11/04 (2006.01)
B60R 11/00 (2006.01)
H04N 23/55 (2023.01)
H04N 23/57 (2023.01)

(52) U.S. Cl.
CPC ............. B60R 11/04 (2013.01); H04N 23/55 (2023.01); H04N 23/57 (2023.01); *B60R 2011/004* (2013.01); *B60R 2011/0059* (2013.01)

(58) Field of Classification Search
CPC ............... B60R 11/04; B60R 2011/004; B60R 2011/0059; H04N 23/55; H04N 23/57
See application file for complete search history.

(56) References Cited

U.S. PATENT DOCUMENTS

| | | | |
|---|---|---|---|
| 10,369,936 B2 | 8/2019 | Leonelli, Jr. | |
| 2019/0106243 A1* | 4/2019 | Maroofian | ......... B65D 21/0206 |
| 2019/0200954 A1* | 7/2019 | Flores, II | ............. A61B 8/4209 |
| 2020/0130606 A1* | 4/2020 | Xu | ........................... B60R 11/04 |

* cited by examiner

*Primary Examiner* — Nasim N Nirjhar
(74) *Attorney, Agent, or Firm* — Jeremy J. Klobucar

(57) ABSTRACT

A front fascia for a vehicle including a camera assembly; a first panel defining a through-hole configured for receipt of the camera assembly, a perimeter of the through-hole having a plurality of retention features configured to support and orient the camera assembly relative to the through-hole; and a second panel including a seat configured for receipt of the camera assembly, wherein the first panel includes a plurality of hollow protrusions located proximate the through-hole configured to mate with a plurality of projections formed on the second panel; and the camera assembly is sandwiched and secured between the first panel and the second panel when the plurality of projections are mated with the plurality of hollow protrusions.

14 Claims, 6 Drawing Sheets

VEHICLE CAMERA MOUNTING STRUCTURE

FIELD

The present disclosure relates to a vehicle camera mounting structure.

BACKGROUND

This section provides background information related to the present disclosure which is not necessarily prior art.

It is increasingly common for vehicles to have a camera attached to a front of a vehicle for various purposes including, for example, assisting with active cruise control, parking assistance, and recording images in front of the vehicle while the vehicle is being operated. Typically, the camera is attached to a bracket, which is then attached to a front fascia or grille of the vehicle using fasteners. This configuration, however, increases manufacturing time due to the need to first attach the camera to the bracket, and then having attach the bracket including the camera to the fascia or grille with fasteners. This configuration also increases manufacturing costs due to the costs associated with manufacturing and/or purchasing the bracket and fasteners.

SUMMARY

This section provides a general summary of the disclosure, and is not a comprehensive disclosure of its full scope or all of its features.

According to a first aspect of the present disclosure, there is provided a vehicle including a front fascia camera mounting structure for supporting a camera assembly, the front fascia camera mounting structure comprising a first panel defining a through-hole having a plurality of retention features, the through-hole being configured for receipt of the camera assembly and the plurality of retention features configured to support and orient the camera assembly relative to the through-hole; and a second panel including a seat configured for receipt of the camera assembly, wherein the first panel includes a plurality of hollow protrusions located proximate the through-hole configured to mate with a plurality of projections formed on the second panel; and the camera assembly is sandwiched and secured between the first panel and the second panel when the plurality of projections are mated with the plurality of hollow protrusions.

According to the first aspect, the seat includes an aperture configured for receipt of a lens of the camera assembly.

According to the first aspect, the camera assembly includes a base having a front surface including the lens and a rear surface from which a cartridge projects outward, and the front surface is configured to abut the seat and the rear surface is configured to be gripped by the plurality of retention features.

According to the first aspect, the first panel includes a pair of upstanding ribs extending along an interior surface of the first panel, the hollow projections extending outward from the upstanding ribs.

According to the first aspect, each of the hollow protrusions include a proximate end attached to the upstanding rib and a distal end that defines a slot having an inwardly extending tab.

According to the first aspect, each of the projections includes an opening configured for receipt of the inwardly extending tab.

According to the first aspect, a plurality of alignment features are positioned about a perimeter of the through-hole that align with a plurality of slats provided on the base of the camera assembly.

According to the first aspect, the camera assembly is sandwiched and secured between the first panel and the second panel without a bracket and without a fastener.

According to a second aspect of the present disclosure, there is provided a front fascia for a vehicle, comprising a camera assembly; a first panel defining a through-hole configured for receipt of the camera assembly, a perimeter of the through-hole having a plurality of retention features configured to support and orient the camera assembly relative to the through-hole; and a second panel including a seat configured for receipt of the camera assembly, wherein the first panel includes a plurality of hollow protrusions located proximate the through-hole configured to mate with a plurality of projections formed on the second panel; and the camera assembly is sandwiched and secured between the first panel and the second panel when the plurality of projections are mated with the plurality of hollow protrusions.

According to the second aspect, the seat includes an aperture configured for receipt of a lens of the camera assembly.

According to the second aspect, the camera assembly includes a base having a front surface including the lens and a rear surface from which a cartridge projects outward, and the front surface is configured to abut the seat and the rear surface is configured to be gripped by the plurality of retention features.

According to the second aspect, the first panel includes a pair of upstanding ribs extending along an interior surface of the first panel, the hollow projections extending outward from the upstanding ribs.

According to the second aspect, each of the hollow protrusions include a proximate end attached to the upstanding rib and a distal end that defines a slot having an inwardly extending tab.

According to the second aspect, each of the projections includes an opening configured for receipt of the inwardly extending tab.

According to the second aspect, a plurality of alignment features are positioned about a perimeter of the through-hole that align with a plurality of slats provided on the base of the camera assembly.

According to the second aspect, the camera assembly is sandwiched and secured between the first panel and the second panel without a bracket and without a fastener.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
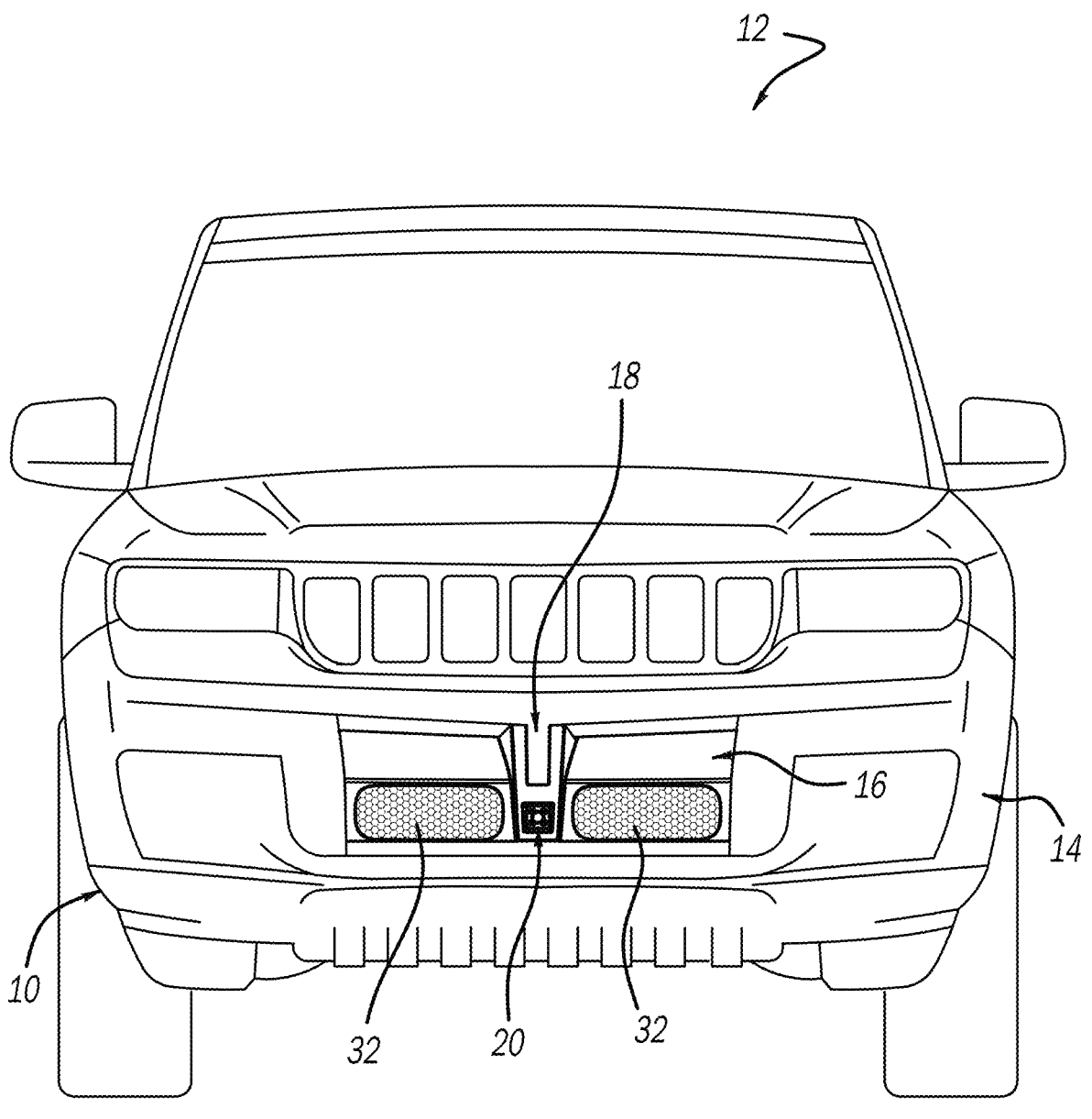
FIG. 1 is a front perspective view of a vehicle including a camera mounting structure according to a principle of the present disclosure.

FIG. 1 illustrates a front 10 of a vehicle 12. Front 10 of vehicle 12 includes a fascia assembly 14 including a first panel 16, a second panel 18 attached to the first panel 16, and a camera assembly 20. As will be described in more detail below, camera assembly 20 is sandwiched between the first panel 16 and the second panel 18 such that no fasteners or additional brackets are required to mount camera assembly 20 relative to fascia assembly 14, which improves manufacturing time and reduces costs.

Figure 2:
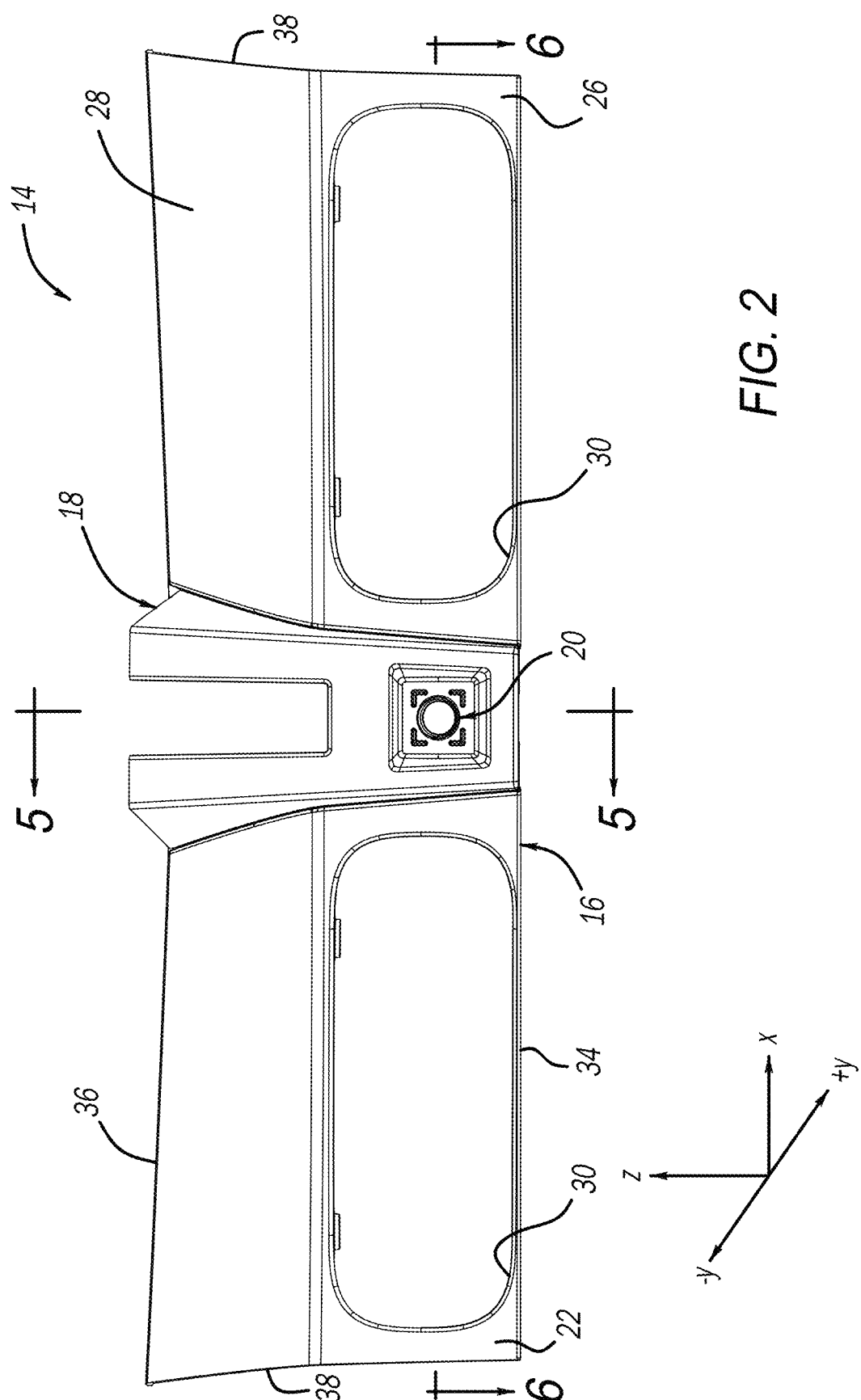
FIG. 2 is a front perspective view of a front fascia of the vehicle illustrated in FIG. 1 that includes the camera mounting structure according to a principle of the present disclosure.
Figure 3:
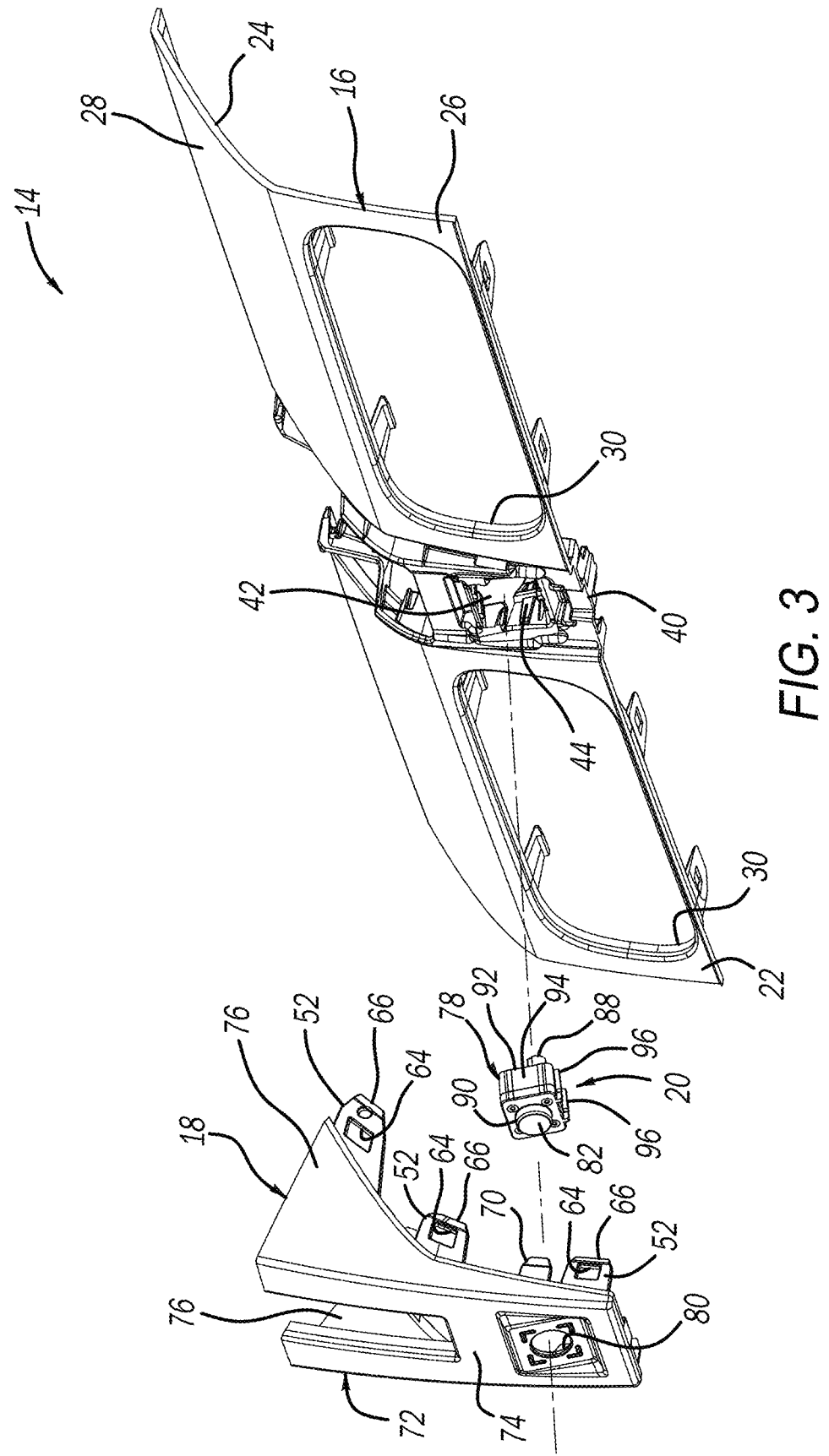
FIG. 3 is an exploded front perspective view of the front fascia illustrated in FIG. 2.
Figure 4:
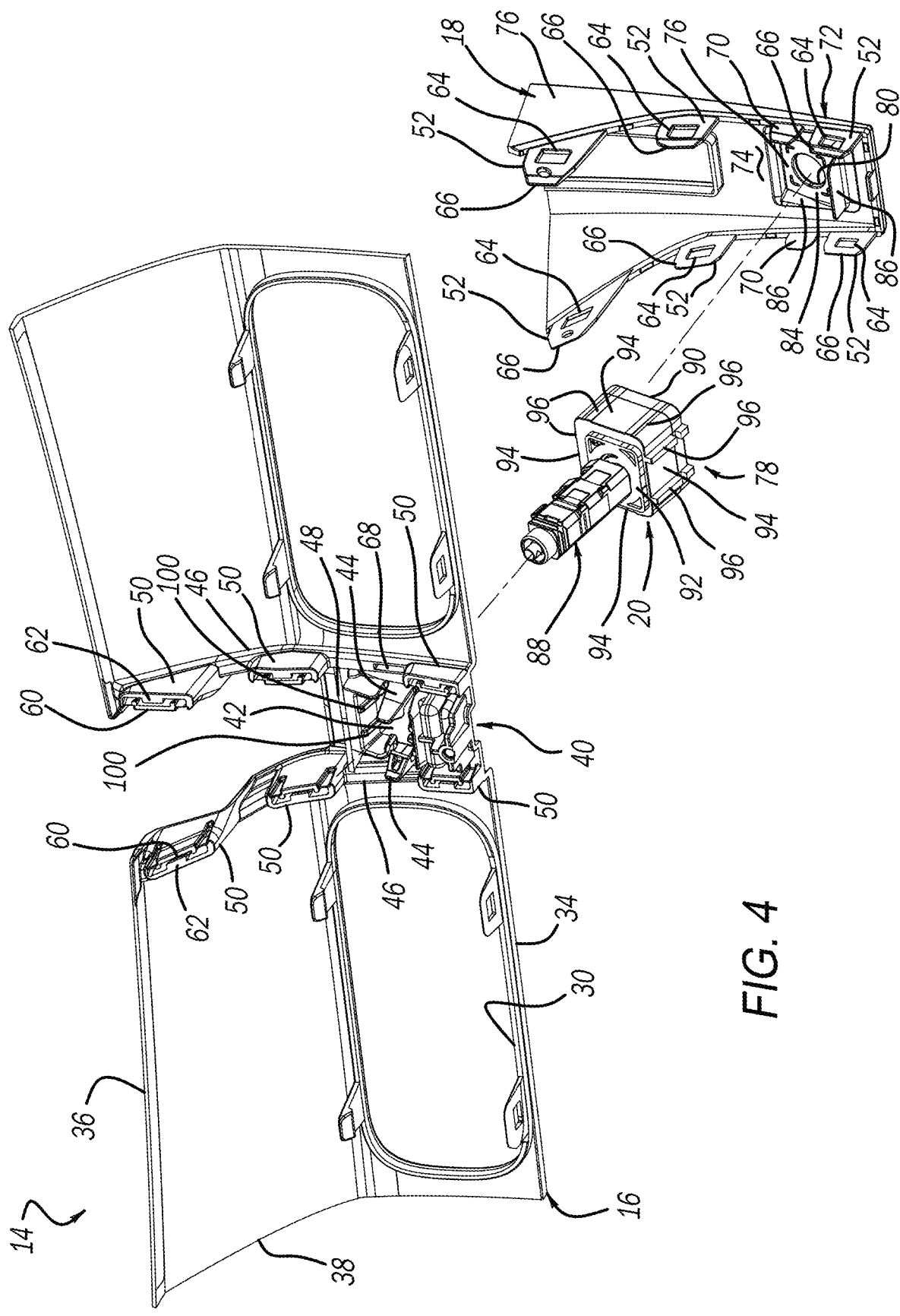
FIG. 4 is an exploded rear perspective view of the front fascia illustrated in FIG. 2.
Figure 5:
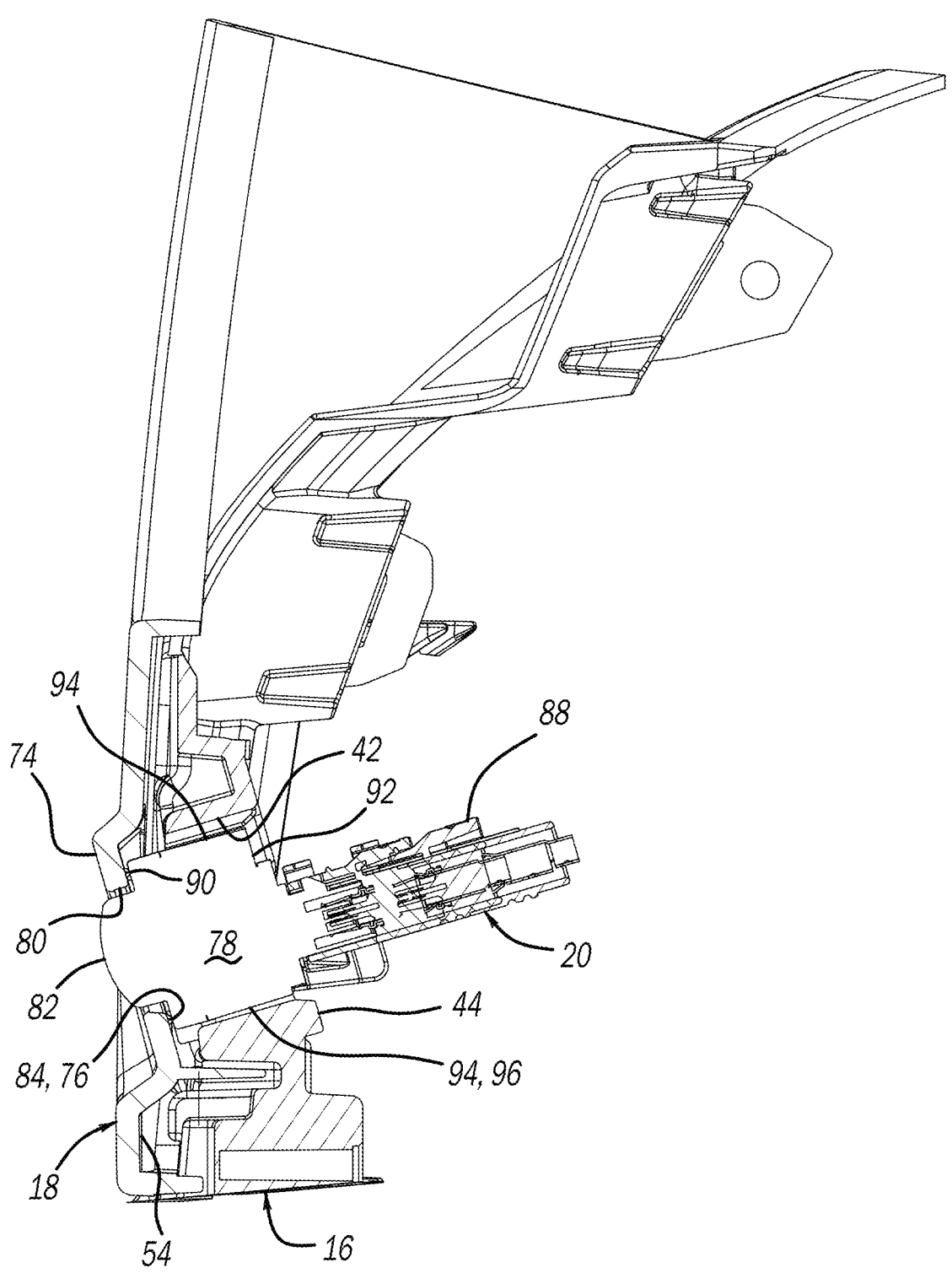
FIG. 5 is a cross-sectional view of the front fascia illustrated in FIG. 2 along line 5-5.
Figures 6, 7:
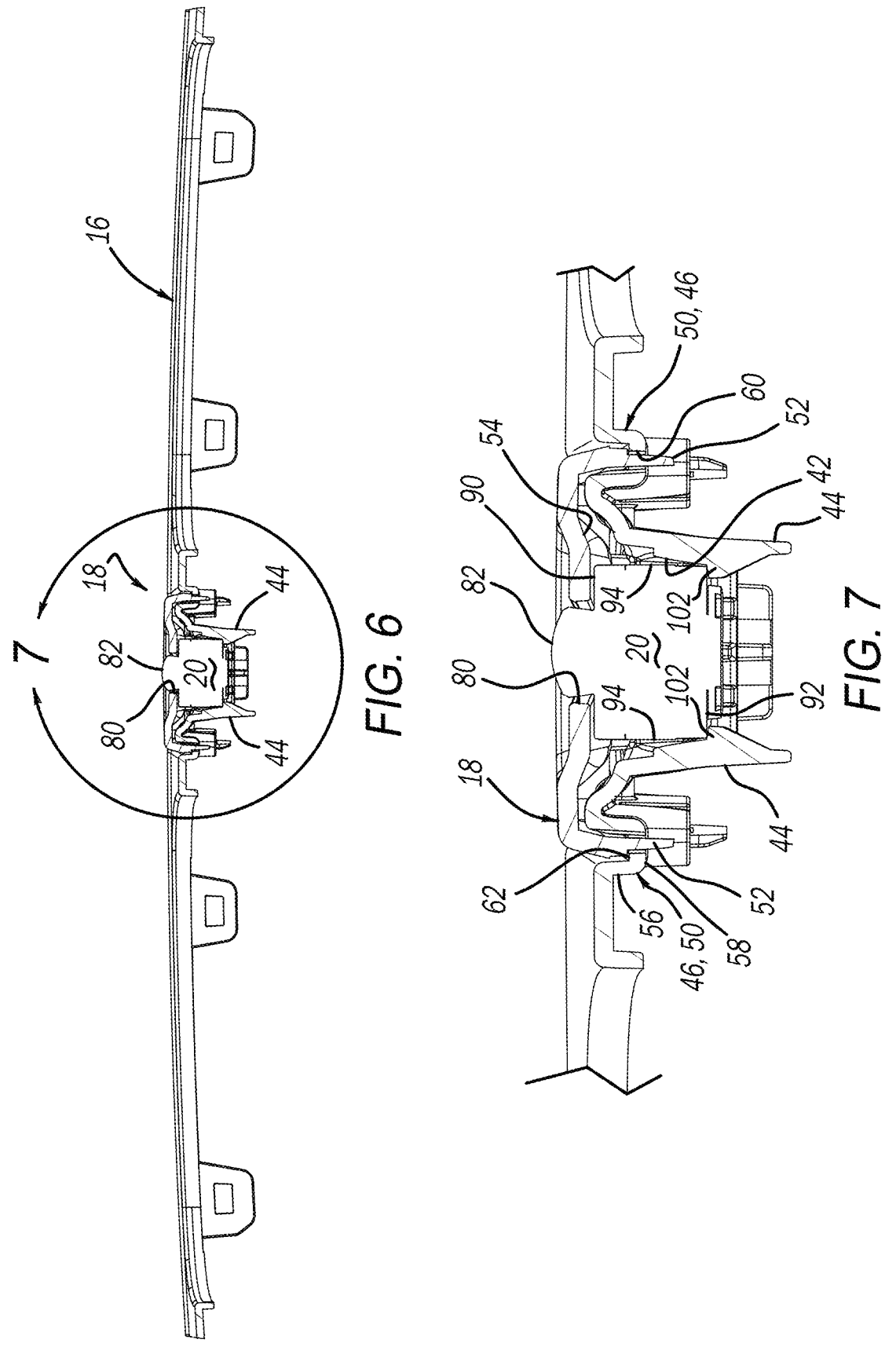
FIG. 6 is a cross-sectional view of the front fascia illustrated in FIG. 2 along line 6-6.
FIG. 7 is an enlarged view of a portion of FIG. 6.

FIG. 2 is a perspective view of fascia assembly 14, and FIGS. 3 and 4 are exploded views of fascia assembly 14. First and second panels 16 and 18 may be formed of an injection-molded polymeric material, but may be formed of, for example, a rigid metal material if desired. First panel 16 includes an outer or exterior surface 22 and an opposite interior surface 24. First panel 16 includes a first section 26 extending in the z-direction (i.e., upper direction) and a second section 28 unitary with the first section 26 that is angled relative to the extends in the z- and negative y-direction (i.e., aft direction). First section 26 may include a plurality of optional apertures 30 that are configured for receipt of, for example, various features of vehicle 10 including, but not limited to, various sensors (not shown) and the like. Alternatively, if no sensors or other functional features are received by apertures 30, apertures 30 may receive third panels 32 (FIG. 1) that provide the fascia assembly 14 with a sleek and aesthetic appearance. First panel 16 also includes a lower edge 34, an upper edge 36, and a pair of lateral edges 38 that extend between lower edge 34 and upper edge 36.

Now referring to FIGS. 3-7, it can be seen that first section 26 of first panel includes a portion 40 that overlaps second panel 18 and defines a through-hole 42 having a plurality of retention features 44 that is configured for receipt of camera assembly 20. Portion 40 extends between a pair of upstanding ribs 46 that extend between first edge 34 and second edge 36. At least one cross-rib 48 extends between ribs 46, and ribs 46 and cross-rib 48 are configured to provide increased structural rigidity to fascia 14 where camera assembly 20 is mounted.

Ribs 46 each include a plurality of outwardly extending hollow protrusions 50 that are each configured for receipt of a projection 52 that extends outward from an interior surface 54 of second panel 18 such that second panel 18 can be mated and secured to first panel 16. In this regard, each hollow protrusion 50 includes a proximate end 56 unitary with one of the ribs 46 and a distal end 58. Distal end 58 defines a slot 60 and includes a laterally inwardly extending tab 62 that, when projection 52 is inserted into hollow protrusion 50, will mate with a correspondingly shaped opening 64 formed in a terminal end 66 of projection 52. In the illustrated embodiment, each rib 46 includes three hollow protrusions 50. It should be understood, however, that a greater or lesser number of hollow protrusions and corresponding number of projections 52 formed on second panel 18 is contemplated as desired by one skilled in the art. Although not required, ribs 46 may also include an elongated aperture 68 configured for receipt of a locating feature 70 provided on second panel 18.

In addition to projections 52 and locating feature 70, second panel 18 includes a body 72 having a primary panel 74 and a pair of outwardly extending ears 76 that include projections 52 and locating feature 70. Primary panel 74 includes a seat 76 configured to mate with and orient a base 78 of camera assembly 20. Seat 76 defines an aperture 80 sized to correspond to a lens 82 of camera assembly 20, and a planar surface 84 surrounds aperture 80. Planar surface 84 is surrounded by orientation tabs 86 that limit movement of base 78 when camera assembly 20 is abutted against seat 76.

Camera assembly 20 is a two-piece structure including base 78 having lens 82 and a cartridge 88 that mates with base 78. Base 78 may be a box-shaped structure having a front surface 90 that is configured to abut against seat 76, a rear surface 92 that is configured to be gripped by retention features 44, and a plurality of side surfaces 94 that extend between front surface 90 and rear surface 92. Although not required, side surfaces 94 may include outwardly extending slats 96 that may assist in orienting base 78 between first panel 16 and second panel 18, as will be described in more detail below. Preferably, slats 96 that are located on the side surface 94 that corresponds to the bottom surface of base 78 extend outward to a greater extent in comparison to slats 96 formed on the other side surfaces 94 so that camera assembly 20 can be correctly oriented when mounted between first and second panels 16 and 18.

To mount camera assembly 20 between first panel 16 and second panel 18, camera assembly 20 may be grasped and manipulated such that the slats 96 are facing downward (i.e., toward the ground). Then, front surface 90 of base 78 is seated against seat 76 such that lens 82 is aligned with aperture 80. Next, the operator may grasp the combination of camera assembly 20 and second panel 18 and orient the combination relative to first panel 16. That is, the combination of camera assembly 20 and second panel 18 is positioned in front of outer surface 22 of first panel 16 and cartridge 88 is passed through through-hole 42.

As cartridge 88 is passed through through-hole 42, slats 96 of base 78 may be aligned with and slid along alignment features 98 that are ridges 100 are formed at various locations about through-hole 42 of first panel 16. As base 78 is further advance into through-hole 42, projections 52 will mate with hollow protrusions 50 and rear surface 92 of base 78 will approach retention features 44 that are flexible members having an inwardly extending clip 102 that is configured to restrict movement of base 78. As projections 52 are further inserted into hollow protrusions 50, the inwardly extending tab 62 will mate with openings 64 and clips 102 will engage with rear surface 92 of base 78. Thus, camera assembly 20 will be correctly mounted and oriented between first panel 16 and second panel 18 without the use of a fastener or separate mounting bracket. Accordingly, the costs associated with camera assembly 20 can be reduced and manufacturing efficiency of vehicle 12 can be increased.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle including a front fascia camera mounting structure for supporting a camera assembly, the front fascia camera mounting structure comprising:
   a first panel defining a through-hole having a plurality of retention features, the through-hole being configured for receipt of the camera assembly and the plurality of retention features configured to support and orient the camera assembly relative to the through-hole; and
   a second panel including a seat configured for receipt of the camera assembly,
   wherein the first panel includes a plurality of hollow protrusions located proximate the through-hole configured to mate with a plurality of projections formed on the second panel; and
   the camera assembly is sandwiched and secured between the first panel and the second panel when the plurality of projections are mated with the plurality of hollow protrusions, and
   the seat includes an aperture configured for receipt of a lens of the camera assembly.

2. The vehicle according to claim 1, wherein the camera assembly includes a base having a front surface including the lens and a rear surface from which a cartridge projects outward, and
   wherein the front surface is configured to abut the seat and the rear surface is configured to be gripped by the plurality of retention features.

3. The vehicle according to claim 1, wherein the first panel includes a pair of upstanding ribs extending along an interior surface of the first panel, the hollow projections extending outward from the upstanding ribs.

4. The vehicle according to claim 3, wherein each of the hollow protrusions include a proximate end attached to the upstanding rib and a distal end that defines a slot having an inwardly extending tab.

5. The vehicle according to claim 4, wherein each of the projections includes an opening configured for receipt of the inwardly extending tab.

6. The vehicle according to claim 1, wherein a plurality of alignment features are positioned about a perimeter of the through-hole that align with a plurality of slats provided on the base of the camera assembly.

7. The vehicle according to claim 1, wherein the camera assembly is sandwiched and secured between the first panel and the second panel without a bracket and without a fastener.

8. A front fascia for a vehicle, comprising:
   a camera assembly;
   a first panel defining a through-hole configured for receipt of the camera assembly, a perimeter of the through-hole having a plurality of retention features configured to support and orient the camera assembly relative to the through-hole; and
   a second panel including a seat configured for receipt of the camera assembly,
   wherein the first panel includes a plurality of hollow protrusions located proximate the through-hole configured to mate with a plurality of projections formed on the second panel;
   the camera assembly is sandwiched and secured between the first panel and the second panel when the plurality of projections are mated with the plurality of hollow protrusions, and
   a plurality of alignment features are positioned about a perimeter of the through-hole that align with a plurality of slats provided on the base of the camera assembly.

9. The front fascia according to claim 8, wherein the seat includes an aperture configured for receipt of a lens of the camera assembly.

10. The front fascia according to claim 9, wherein the camera assembly includes a base having a front surface including the lens and a rear surface from which a cartridge projects outward, and
   wherein the front surface is configured to abut the seat and the rear surface is configured to be gripped by the plurality of retention features.

11. The front fascia according to claim 8, wherein the first panel includes a pair of upstanding ribs extending along an interior surface of the first panel, the hollow projections extending outward from the upstanding ribs.

12. The front fascia according to claim 11, wherein each of the hollow protrusions include a proximate end attached to the upstanding rib and a distal end that defines a slot having an inwardly extending tab.

13. The front fascia according to claim 12, wherein each of the projections includes an opening configured for receipt of the inwardly extending tab.

14. The front fascia according to claim 8, wherein the camera assembly is sandwiched and secured between the first panel and the second panel without a bracket and without a fastener.

* * * * *